US006193119B1

(12) United States Patent
Schwarm

(10) Patent No.: US 6,193,119 B1
(45) Date of Patent: Feb. 27, 2001

(54) TOOL HOLDER

(76) Inventor: Carsten J. Schwarm, 9235 Lakeside Way, Gainesville, GA (US) 30506

( * ) Notice: Subject to any disclaimer, the term of this patent is extended or adjusted under 35 U.S.C. 154(b) by 0 days.

(21) Appl. No.: 09/506,990

(22) Filed: Feb. 18, 2000

(51) Int. Cl.[7] .................................................... A01K 97/04
(52) U.S. Cl. .......................... 224/197; 224/271; 224/904
(58) Field of Search .................................... 224/185, 195, 224/197, 268, 271, 904; 206/371

(56) References Cited

U.S. PATENT DOCUMENTS

| | | | |
|---|---|---|---|
| 4,598,027 | * 7/1986 | Johnson | 224/904 X |
| 5,016,796 | * 5/1991 | Johnson | 224/245 |
| 5,341,976 | * 8/1994 | Rider | 224/269 |
| 5,375,749 | * 12/1994 | Oliva | 224/271 |
| 5,934,531 | * 8/1999 | Jablonic et al. | 224/222 |
| 5,947,353 | * 9/1999 | Johnson | 224/267 |

* cited by examiner

*Primary Examiner*—Stephen K. Cronin
(74) *Attorney, Agent, or Firm*—Hinkle & Associates, PC

(57) ABSTRACT

The invention is a holder to hold a tool, such as a carpenter's square, which has a flat planar surface with multiple edges and has attached to one of the edges a perpendicularly mounted planar flange. The flange of the tool has a detent recess therein to cooperate with a button detent in the scabbard. The scabbard is mounted to a carrying sheath by means of a pintle and gudgeon attachment to allow free rotation of the scabbard for ease of manipulation by the user. The scabbard is a generally hollow elongated rectangular configured member wherein the flange of the tool slides into the hollow interior of the scabbard and slides down through a slot in one wall of the scabbard until the detent recess impinges upon the button detent to thereby secure the tool within the scabbard. The scabbard detent means may take several configurations, but mainly will be effective in using a leaf detent button mechanism or a self-contained spring loaded button detent mechanism.

11 Claims, 2 Drawing Sheets

TOOL HOLDER

BACKGROUND OF THE INVENTION

I. Field of the Invention.

The present invention relates generally to the field of personal tool holders and, more particularly, to a belt mounted holder which has a scabbard for receiving a common type of carpenter's tool.

II. Description of the Related Art.

As is well known, there are many types of tool holders which working persons utilize to maintain various tools close by the body for ease of use. Typically, it is quite easy to mislay small tools which are frequently used by a working person, and it has been found that to have a particular means for maintaining the tools with the person proves quite valuable in both saving time in looking for a mislaid tool and in preventing the possibility of a lost tool. For instance, carpenters typically will have a belt which will have a loop for holding hammers and like accessories, and very possibly will have holders which will maintain measuring tapes and other small implements to the tool belt. Electricians and like trades typically utilize pouches which hold specialized tools of the trade, and these pouches are typically affixed to a belt warn by the working person.

It has been found that there is a need for a tool holder as contemplated in the present invention which is inexpensive and is of such simplicity that a typical carpenter's square may be maintained therein on a belt worn by the working person.

SUMMARY OF THE INVENTION

In accordance with the present invention and the contemplated problems which have and continue to exist in this field, objectives of this invention are to provide a tool holder which is simple to manufacture, is of low cost, is easily worn by the user and will hold a standard tool for ease of use by the user, yet will allow the tool to be easily removed for use and then returned to the scabbard for storage and be retained in the scabbard securely.

This invention accomplishes the above and other objectives to hold a tool such as a carpenter's square which has a flat planar surface with multiple edges, and has attached to one of the edges a perpendicularly mounted planar flange. The flange of the tool has a detent recess therein to cooperate with a button detent in the scabbard. The scabbard is mounted to a carrying sheath by means of a pintle and gudgeon attachment to allow free rotation of the scabbard for ease of manipulation by the user. The scabbard is a generally hollow elongated rectangular configured member wherein the flange of the tool slides into the hollow interior of the scabbard and slides down through a slot in one wall of the scabbard until the detent recess impinges upon the button detent to thereby secure the tool within the scabbard. The scabbard detent means may take several configurations, but mainly will be effective in using a leaf detent button mechanism or a self-contained spring loaded button detent mechanism.

Other objects, advantages and capabilities of the invention will become apparent from the following description taken in conjunction with the accompanying drawings showing the preferred embodiment of the invention.

DESCRIPTION OF THE PREFERRED EMBODIMENT

Figure 1:
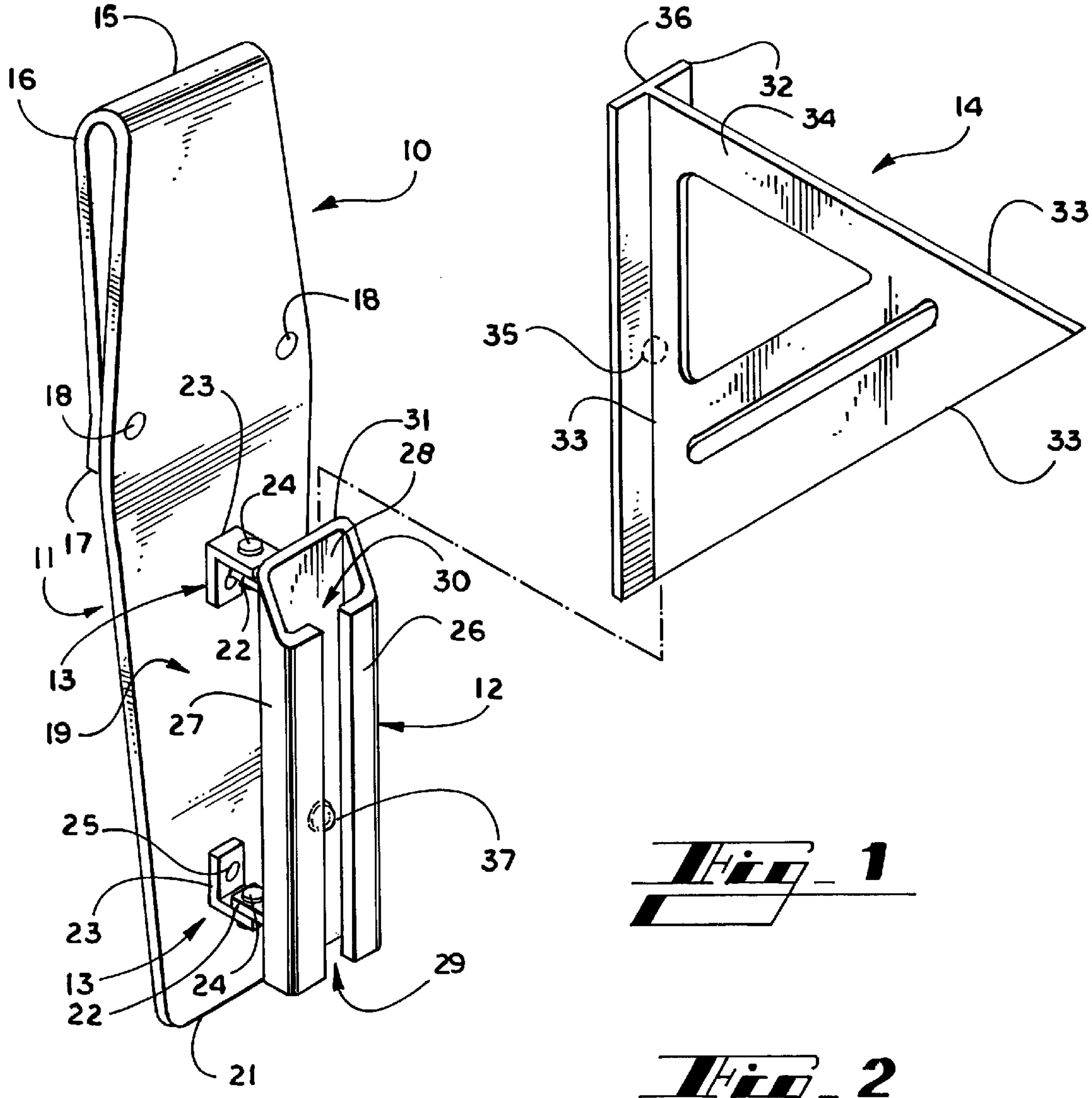
FIG. 1 is an exploded perspective view of the tool holder of the invention and of a typical carpenter's tool which would be utilized therewith.
Figure 2:
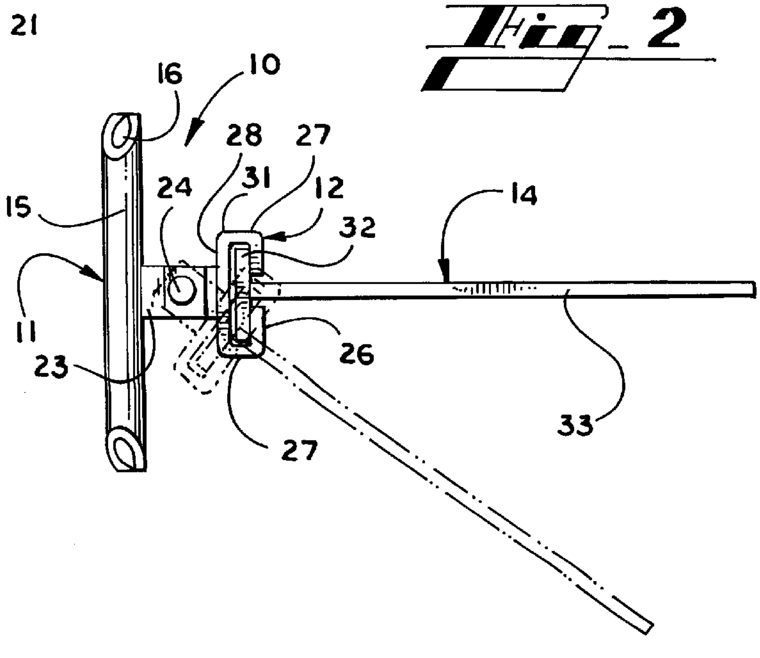
FIG. 2 is atop plan view of the invention with the tool inserted into the scabbard and showing the pivotal capability of the scabbard.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. A tool holder 10 is shown having a carrying sheath 11 to which is affixed a scabbard 12 mounted upon one or more scabbard mounts 13. The scabbard is adapted to hold tool 14 therein as will be described.

The carrying sheath 11 is generally manufactured of a flexible material of elongated shape having a first upper end 15 which is folded about itself to form a belt loop 16 wherein the distal end 17 of the belt loop is affixed to the main body of the sheath by rivets 18. A center area 19 of the sheath 11 is located between the first end 15 and the second end 21, and mounted to the center area 19 is the scabbard 12. The scabbard could be mounted to a standard belt, if desired, and bypass the sheath 1 1. Such an arrangement would contemplate that the mount 13 would be mounted directly to a belt, rather than the sheath 11.

The scabbard 12 is mounted to the sheath by means of the scabbard mounts 13 which generally comprise a scabbard mounted pintle 22 and a sheath mounted gudgeon 23. The pintle and the gudgeon are connected together by the pintle pin 24 in order to allow pivotal movement by the scabbard. The gudgeon will typically be mounted to the sheath 11 by means of rivets 25 and the pintle will be mounted to the scabbard by a suitable means, not shown, which may include welding or a mechanical mounting means such as a rivet. While the drawings indicate a plurality of mounts 13, it should be noted that the invention also contemplates only a single mount.

The scabbard is of an elongated substantially hollow rectangular cross-sectional configuration having four walls, namely, a front wall 26, two side walls 27 and a rear wall 28. As noted in FIG. 1, the front wall 26 has a slot 29 running the full length thereof in order to accommodate the tool 14. The proximal end 31 of the scabbard 12 is shown slanted downwardly both for esthetic and ease of use reasons. It has been found that the user can greatly facilitate the entry of the tool 14 into the scabbard 12 if the user can feel the slanted top edge and then place the flange 32 of the tool into the chamber 30 of the scabbard.

Figure 3:
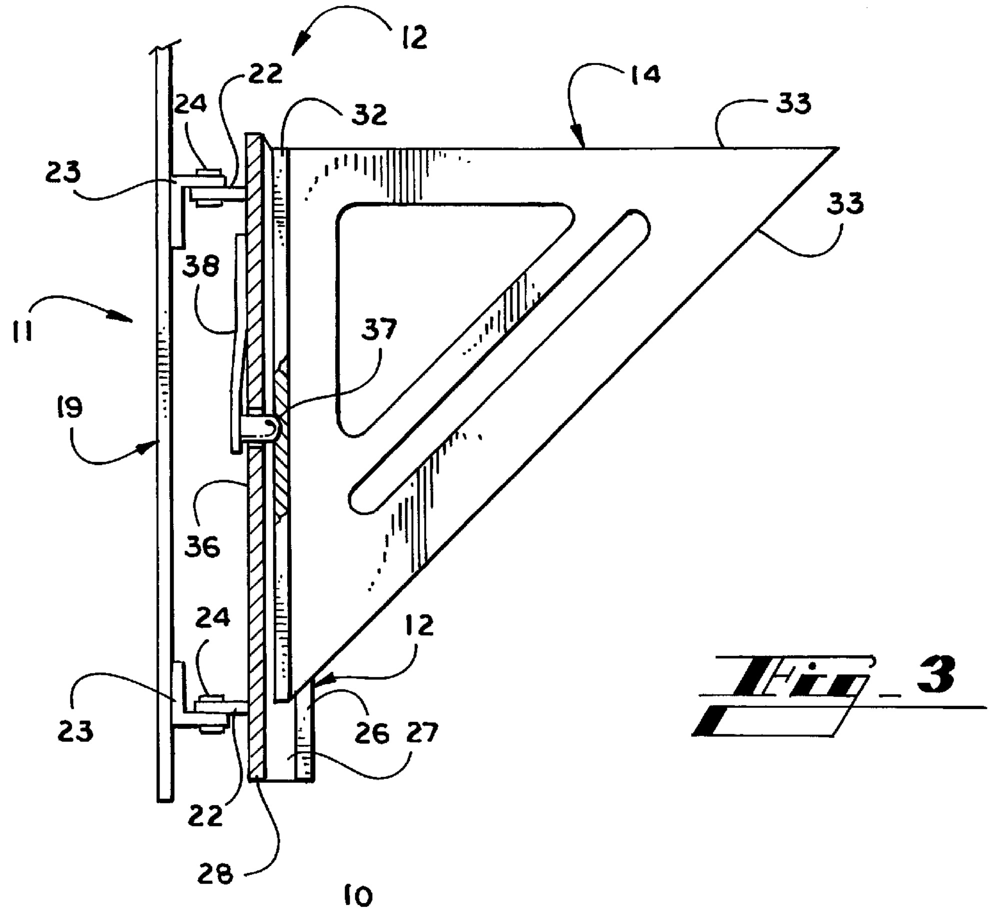
FIG. 3 is a side elevation view, partially in section, showing a tool mounted in the scabbard with a leaf-type detent securing the tool.

As seen especially in FIG. 1, the tool 14 has the aforementioned flange 32 joined to one of the edges 33 such that the juncture of the flange 32 with one edge 33 forms a perpendicular wherein the flange will easily slide into chamber 30 of the scabbard, and the tool surface 34 will slide down through slot 29. As the tool 14 is being positioned within chamber 30, the detent recess 35 on the rearward face 36 of the tool will become positioned adjacent to and juxtaposed with button detent 37 within chamber 30. When viewing the tool holder in FIG. 3, one embodiment of the detent is a leaf spring 38 which is suitably affixed to the rear portion of the rear wall 28 of the scabbard by any suitable means to effect the attachment, and extends downwardly toward the detent button aperture 39 which projects through the rear wall 28 of the scabbard. Obviously, the leaf spring could be positioned in another position on the rear wall 28 and effect the same operation. The detent button 37 is attached to the leaf spring 38 and projects through the detent button aperture 39 into the chamber 30 for interaction with detent recess 35 at desired times. The present invention contemplates the use of a tool 14 with a detent recess 35, however, it has been found that the holder may work equally well by having the detent button 37 frictionally engage flange 32 and, by pressing against the flange, button 37 will maintain the tool in the scabbard.

Figure 4:
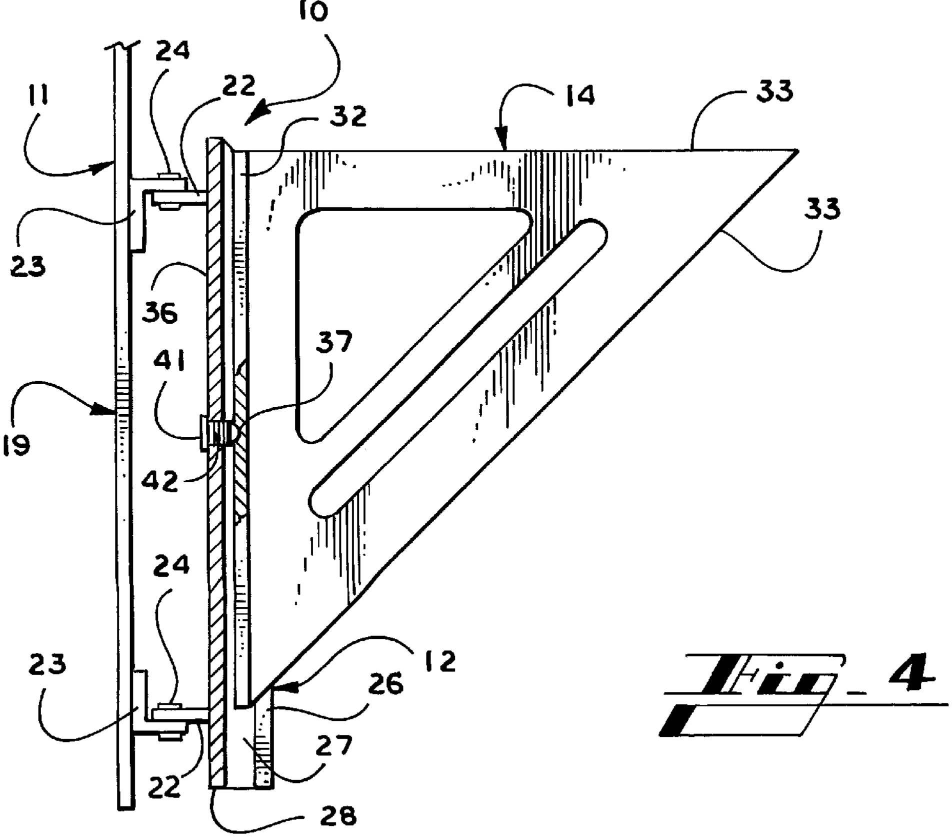
FIG. 4 is a side elevation view, partially in section, showing the tool mounted in the scabbard with a spring loaded button detent.

In FIG. 4 another embodiment of the detent mechanism is shown wherein a mounting flange 41 is affixed to the rearmost surface of rear wall 28 and the detent button 37 is free floating within a holding spring 42 whose one end is attached to the mounting flange 41 and the other end wraps around the detent button 37, wherein the detent button is reciprocatively mounted so that when the tool 14 is moved into engagement with the detent button 37, the button reciprocates away from the tool until the detent recess 35 comes in contact with the detent button 37 thereby engaging the tool in a firm and secure relationship within the scabbard 12. Whether the detent button 37 of FIG. 3 or the detent button 37 of FIG. 4 is utilized, the operation is the same with respect to insertion of the tool 14 into the scabbard 12 for engagement with the detent button 37.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A tool holder for holding a tool, the tool having a flat planar surface with multiple edges and a perpendicularly mounted planar flange attached to one of the edges, the improvement comprising:

- an elongated planar sheath having a first end and a second end, a center area disposed between the first and second ends,
- the first end having a loop therein,
- an elongated scabbard mounted to the center area of the sheath, the scabbard being of an elongated substantially hollow rectangular cross-sectional configuration having four walls, each wall having interior and exterior surfaces,
- a slot being disposed within one of the scabbard walls communicating with the hollow interior of the scabbard, and
- detent means mounted on the scabbard for cooperative engagement with the flange of the tool.

2. A tool holder as claimed in claim 1, wherein the exterior surface of one of the exterior wall surfaces of the scabbard has at least one pintle and gudgeon mounting means, the scabbard pintle and gudgeon mounting means being affixed to the center area of the sheath.

3. A tool holder has claimed in claim 2, wherein the detent means comprises a leaf spring mounted on one of the exterior surfaces of one of the walls of the scabbard, the said wall mounting the leaf spring having an aperture therein, the leaf spring having a detent button mounted thereon and projecting through the aperture and into the hollow interior of the scabbard.

4. A tool holder as claimed in claim 2, wherein the pintle and gudgeon mounting means comprise a scabbard pintle projecting from said one of the exterior wall surfaces of the scabbard and being rotatably mounted in a gudgeon mounted to the center area of the sheath.

5. A tool holder as claimed in claim 2, wherein the detent means comprises a spring loaded button detent mounted within an aperture of one of the walls of the scabbard and projecting through the aperture and into the hollow interior of the scabbard.

6. A tool holder as claimed in claim 2, wherein there are two pintle and gudgeon mounting means and both pintle and gudgeon mounting means are affixed to the center area of the sheath.

7. A tool holder as claimed in claim 6, wherein the detent means comprises a leaf spring mounted on one of the exterior surfaces of one of the walls of the scabbard, the said wall mounting the leaf spring having an aperture therein, the leaf spring having a detent button mounted thereon and projecting through the aperture and into the hollow interior of the scabbard.

8. A tool holder has claimed in claim 6, wherein the pintle and gudgeon mounting means comprise a first and second scabbard pintle projecting from said one of the exterior wall surfaces of the scabbard, each of the pintles being rotatably mounted in a respective gudgeon mounted to the center area of the sheath.

9. A tool holder as claimed in claim 6, wherein the detent means comprises a spring loaded button detent mounted within an aperture of one of the walls of the scabbard and projecting through the aperture and into the hollow interior of the scabbard.

10. A tool holder for holding a tool, the tool having a flat planar surface with multiple edges and a perpendicularly mounted planar flange attached to one of the edges and wherein the flange has a detent recess therein, the improvement comprising:

- an elongated planar sheath having a first end and a second end, a center area disposed between the first and second ends,
- the first end having a loop therein,
- an elongated scabbard mounted to the center area of the sheath, the scabbard being of an elongated substantially hollow rectangular cross-sectional configuration having four walls, each wall having interior and exterior surfaces,
- a slot being disposed within one of the scabbard walls communicating with the hollow interior of the scabbard,
- detent means mounted on the scabbard for cooperative engagement with the detent recess of the tool,
- the exterior surface of one of the walls of the scabbard has at least one pintle and gudgeon mounting means, the scabbard pintle and gudgeon mounting means being affixed to the center area of the sheath,
- the pintle and gudgeon mounting means comprise a scabbard pintle projecting from one of the exterior wall surfaces of the scabbard and being rotatably mounted in a gudgeon mounted to the center area of the sheath, and
- the detent means comprises a leaf spring mounted on one of the exterior surfaces of one of the walls of the scabbard, the said wall mounting the leaf spring having an aperture therein, the leaf spring having a detent button mounted thereon and projecting through the aperture and into the hollow interior of the scabbard.

11. A tool holder for holding a tool, the tool having a flat planar surface with multiple edges and a perpendicularly mounted planar flange attached to one of the edges and wherein the flange has a detent recess therein, the improvement comprising:

an elongated planar sheath having a first end and a second end, a center area disposed between the first and second ends, the first end having a loop therein, an elongated scabbard mounted to the center area of the sheath, the scabbard being of an elongated substantially hollow rectangular cross-sectional configuration having four walls, each wall having interior and exterior surfaces, a slot being disposed within one of the scabbard walls communicating with the hollow interior of the scabbard, detent means mounted on the scabbard for cooperative engagement with the detent recess of the tool, there are two pintle and gudgeon mounting means and both pintle and gudgeon mounting means are affixed to the center area of the sheath, the pintle and gudgeon mounting means comprise a first and second pintle projecting from one of the exterior wall surfaces of the scabbard, each of the pintles being rotatably mounted in a respective gudgeon mounted to the center area of the sheath, and the detent means comprises a spring loaded button detent mounted within an aperture of one of the exterior walls of the scabbard and projecting through the aperture and into the hollow interior of the scabbard.

* * * * *